Patented Mar. 19, 1929.

1,705,723

UNITED STATES PATENT OFFICE.

HERBERT W. DAUDT, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF PRODUCING TETRA-ETHYL LEAD.

No Drawing.    Application filed October 15, 1926.   Serial No. 141,883.

This invention relates to the manufacture of tetra-ethyl lead, and more particularly to the use of magnesium ethyl chloride in the synthesis of tetra-ethyl lead.

Tetramethyl lead, tetrapropyl lead and other tetraalkyl lead derivatives have been prepared by the action of the required magnesium alkyl chloride on lead chloride. However, in the case of the preparation of tetra-ethyl lead, magnesium ethyl iodide or magnesium ethyl bromide has always been used, but in order to use either of these materials on a scale required for lead ethyl manufacture it would be necessary to maintain a very high iodide or bromide recovery.

The object of the present invention is to simplify the production of tetra-ethyl lead. A further object of my invention is to lessen the cost of production of tetra-ethyl lead. Other objects will appear as the description proceeds.

These objects are accomplished by the following invention, in which I have found that tetra-ethyl lead man be produced by the action of magnesium ethyl chloride on lead salts.

The following example indicates by way of illustration an embodiment of the present invention:

A solution of magnesium ethyl chloride in ether is prepared by carefully adding 30 parts of ethyl chloride to 10 parts of magnesium metal turnings, suspended in 125 parts of ether containing one part methyl iodide and a crystal of iodine. This solution is added to a suspension of 60 parts of lead chloride in 125 parts of ether, maintaining a temperature of 0° to 50° C. for the period of addition and for an additional five hours. The mass is then immersed in 600 parts of water. After the ether is distilled off, the tetra-ethyl lead is finally obtained by steam distillation.

The advantages of using magnesium ethyl chloride are primarily those of cheapness and of supply of raw material. For magnesium ethyl chloride there is almost an unlimited supply of halogen, but for magnesium ethyl iodide and magnesium ethyl bromide the cost of the halogen is much higher and the supply limited.

As many apparently widely different embodiments of this invention may be made without departing from the spirit thereof, it is to be understood that I do not limit myself to the foregoing example or description except as indicated in the following patent claims.

I claim:

1. The process of producing tetra ethyl lead which comprises effecting a reaction between magnesium ethyl chloride and a lead salt in the presence of ethyl chloride and an alkyl iodide.

2. The process of producing tetra ethyl lead which comprises effecting a reaction between magnesium ethyl chloride and a lead salt in the presence of ethyl chloride, an alkyl iodide, and iodine.

3. The process of producing tetra ethyl lead which comprises effecting a reaction between magnesium ethyl chloride and lead chloride in the presence of ethyl chloride and alkyl iodide.

4. The process of producing tetra ethyl lead which comprises effecting a reaction between magnesium ethyl chloride and lead chloride in the presence of ethyl chloride, and an alkyl iodide.

In testimony whereof I affix my signature.

HERBERT W. DAUDT.